United States Patent [19]
Belville et al.

[11] Patent Number: 5,114,731
[45] Date of Patent: * May 19, 1992

[54] PRODUCTS FROM GREEN COFFEE TREATMENT

[75] Inventors: David L. Belville, Marysville; Donald E. Wetherilt, Powell; James E. Wimmers, Marysville, all of Ohio

[73] Assignee: Nestec S.A., Vevey, Switzerland

[*] Notice: The portion of the term of this patent subsequent to Jul. 3, 2007 has been disclaimed.

[21] Appl. No.: 535,107

[22] Filed: Jun. 8, 1990

Related U.S. Application Data

[63] Continuation of Ser. No. 265,059, Oct. 31, 1988, Pat. No. 4,938,979.

[51] Int. Cl.$^5$ ............................................. A23F 5/02
[52] U.S. Cl. .................................. 426/595; 426/460; 426/461
[58] Field of Search .................. 426/595, 461, 460

[56] References Cited

U.S. PATENT DOCUMENTS

| | | |
|---|---|---|
| 2,278,473 | 4/1942 | Musher . |
| 2,712,501 | 7/1955 | Hale et al. . |
| 3,088,825 | 5/1963 | Topolian et al. . |
| 3,106,470 | 10/1963 | Spotholz . |
| 3,572,235 | 3/1971 | Nutting et al. . |
| 3,640,726 | 2/1972 | Bolt et al. . |
| 3,767,418 | 10/1973 | Ponzoni et al. . |
| 4,540,591 | 4/1985 | Dar et al. . |
| 4,671,964 | 6/1987 | Davidescu et al. . |
| 4,938,978 | 7/1990 | Husaini ............... 426/595 X |
| 4,938,979 | 7/1990 | Belville et al. ........... 426/595 X |

Primary Examiner—Joseph Golian
Attorney, Agent, or Firm—Vogt & O'Donnell

[57] ABSTRACT

The moisture content of green coffee is increased in the presence of a substantially inert gas atmosphere under a positive pressure to at least about 25% by weight based upon the weight of the moisturized beans. After moisturization, the moisturized beans are heated in the presence of a substantially inert gas atmosphere to a temperature sufficient and for a time sufficient for hydrolyzing and pryolyzing the beans while substantially avoiding charring the beans. The treated beans then are dried.

14 Claims, No Drawings

PRODUCTS FROM GREEN COFFEE TREATMENT

CROSS REFERENCE TO RELATED APPLICATION

This application is a continuation application of application Ser. No. 07/265,059, filed Oct. 31, 1988, now U.S. Pat. No. 4,938,979.

BACKGROUND OF THE INVENTION

The present invention relates to treatment of green coffee beans for preparing them for extraction for obtaining a beverage.

Techniques for treating green coffee beans for preparing the beans for extraction to obtain a beverage include a step which conventionally involves roasting green beans by heating them with hot gases for driving off free and bound water from the beans. This heating initiates and provides for a reaction known as pyrolysis which is essential for developing aromatic, flavor and color characteristics associated with roast and ground coffee. If the roasting conditions are not controlled appropriately, however, charring, or burning, of the coffee beans can occur which produces beans having undesirable aromatic and flavor characteristics. Upon extraction with water utilizing apparatus available to the consuming public, a yield of soluble coffee solids in the extraction brew which is on the order of from about 20% to about 25% by weight based upon the weight of the roasted beans is obtained.

As higher brew yields have been desired, various methods have been proposed to increase the yield of coffees to be extracted for the preparation of a beverage which include subjecting coffee beans to a hydrolysis reaction.

Additionally, it is well accepted that certain varieties of coffees provide extracts which have characteristics which limit their usefulness. Such varieties include "Robustas", for example, which when roasted with heated gases provide extracts which are commonly described as "earthy", "woody" and/or "rubbery", for example. More importantly, such coffees are characterized as being "harsh" and they also have a characteristic "bitterness".

As is apparent from the art, subjecting coffee beans to a hydrolysis reaction not only increases brew yields, but also alters or modifies at least some of the less desired characteristics of the less preferred or so-called low-grade varieties of coffee beans. As is generally accepted, hydrolysis is a reaction involving water and heat which cleaves chemical compounds. The hydrolysis reaction, however, provides beans which yield a brew which has significantly greater acidity than does a brew extracted from beans which merely have been roasted with hot gases. Roasting hydrolyzed beans with hot gases, however, tends to neutralize the increased acidity which makes extracts obtained from them more palatable, but at the same time, this roasting also decreases the yield increase resultant from the hydrolysis reaction.

A process which is said to produce more flavor and strength than prior conventionally roasted products is disclosed in U.S. Pat. No. 2,278,473. In that process, green coffee beans are placed in a chamber and subjected to an injection of steam at elevated pressure and temperature. After the steam treatment, the pressure is released quickly for exploding the beans for providing a cell-disrupted structure. The treated beans then are roasted with heat in an oven. It is taught that the moisture content of the steam treated beans should be below 20% to 25% for enabling the required explosion.

Another process for increasing the yield from green coffee beans is disclosed in U.S. Pat. No. 2,712,501 for obtaining an extract for preparing soluble coffee. After subjecting green beans to saturated steam in a closed vessel, the pressure is released slowly so that the treated coffee beans are not exploded or otherwise disintegrated. The beans then are extracted, but before dehydration to prepare the soluble coffee, the acidity of the extract is neutralized.

U.S. Pat. No. 3,572,235 discloses a process for enhancing flavor and aroma of certain coffees. Green beans first are contacted with steam under pressure under substantially non-oxidizing conditions to raise the moisture content of the beans to from about 12% to about 18% by weight for causing a hydrolysis reaction and a partial roasting of the green beans. Upon completion of the steam treatment, the pressure is released for causing a sudden swelling or puffing of the beans. The treated beans then are contacted with hot roasting gases under substantially oxidizing conditions.

U.S. Pat. No. 3,640,726 discloses a process in which green Robusta beans are placed in a pressure vessel and then, preferably, air is evacuated from the vessel by drawing a vacuum. The beans then are subjected to saturated steam under conditions described as essential for the beans to acquire a moisture content of from 15 weight percent to 35 weight percent and for partially roasting the beans. After steaming, the built-up pressure is released quickly. The treated beans then are subjected to roasting with circulating air at temperatures of at least about 190° C.

Other methods proposed for increasing the soluble solids yield of coffees are those disclosed in U.S. Pat. Nos. 3,088,825 and 3,106,470 which are said to increase the soluble solids yield by from about 10% to about 50% as compared with coffee which is conventionally roasted. It is disclosed that these methods also improve the acidity and flavor characteristics of the coffees.

The '825 patent discloses a two part cycle which comprises first preheating green beans with a hot gas, which reduces the moisture content of the beans, and then contacting the preheated beans with steam under pressure in an enclosed vessel after which the pressure is released suddenly for obtaining puffing and expansion. The '470 patent discloses a three-part cycle comprising the preheating step and the steaming and expansion step, as in the '825 patent, and then a further step of roasting with hot air for a short time which is said to reduce acidity and improve flavor. Use of super-heated steam is advised in each patent so the moisture content of the treated beans is kept to a minimum, such as below 8% by weight, as indicated by the '825 patent.

Still further methods proposed by inventors associated with the assignee of the '825 and '470 patents, to improve the flavor and aroma of coffee varieties such as Robusta coffees, are those disclosed and referred to in U.S. Pat. Nos. 3,767,418, 4,540,591 and 4,671,964.

In the '418 patent it is taught to mix water with green coffee beans, and then to steam the mixture in a confined pressure vessel at an elevated temperature of from about 115° C. to about 177° C. and at a critical steam pressure of from at least about 3.5 kg/cm$^2$ to below about 9.8 kg/cm$^2$ for obtaining treated beans having a moisture content of from about 35% to 55% by weight, but preferably from 40% to 50% by weight, based upon the weight of the wet treated beans. The treated beans are released from the pressure vessel in a manner in which they do not experience substantial puffing or expansion and then are roasted with heated air, but preferably, prior to roasting, the beans are air dried to below 15% moisture by weight.

The '591 patent provides a method for roasting Robusta coffee and blending it with higher quality coffees in which green beans are placed in a pressure vessel such that there is void space for providing room for expansion during steaming under pressure. During processing, gas and condensed steam are vented from the vessel for removing what is said to be undesired gases, for minimizing loss of soluble solids and for reducing acids and sour notes in the treated beans. After steam treatment, the treated beans are roasted with hot gases or by the process of the afore-mentioned '825 patent.

The '964 patent, which makes reference to the '418 and '591 patents, seeks to provide an "efficient method" for upgrading the quality of poor quality beans. Green beans are treated with steam to preheat the beans to a temperature of from about 115° C. to about 154° C. for about 0.5 min. to about 3 mins., which raises the moisture content of the beans in addition to preheating them. The pre-treated beans then are moisturized with preheated water to a moisture level of from about 35% to about 45% by weight, and then the moisturized beans are steamed at a temperature of from about 115° C. to about 154° C. at a pressure of from about 1.4 kg/cm$^2$ to about 4.9 kg/cm$^2$ The beans then are roasted in a conventional manner, preferably after drying which lowers the moisture content.

SUMMARY OF THE INVENTION

The present invention is characterized by increasing the moisture content of green coffee beans contained in the presence of a substantially inert gas atmosphere under a positive pressure for obtaining moisturized beans having a moisture content of at least about 25% by weight based on the total weight of the moisturized beans and heating the moisturized beans contained in a substantially inert gas atmosphere to a temperature sufficient and for a time sufficient for hydrolyzing and pyrolyzing the beans while substantially avoiding charing the beans. The hydrolyzed and pyrolyzed beans then are dried to a stable moisture content which avoids staling.

Although the inert gas atmosphere about the moisturized beans when hydrolyzing and pyrolyzing them may be initially under a positive pressure, preferably, the substantially inert gas atmosphere about the beans is initially, that is, at the time of applying heat for the heat-treatment, at about substantially atmospheric pressure. Preferably, the beans are agitated during at least the hydrolyzing and pyrolyzing step, agitation being defined herein as the beans being placed in a dynamic condition such that the beans being treated have movement relative to each other so that they are subjected to substantially the same treatment conditions. Conveniently, steam is applied to contact the moisturized beans in the heat-treatment step for heating them.

The process of the present invention produces beans which do not require roasting with hot gases. The treated beans have a dark brown color which penetrates into and through the body of the beans. Upon extraction with machines such as utilized in the home, for example, the treated beans provide an extraction yield of soluble solids in excess of 30% by weight, on a dry weight basis, of the beans extracted, and brew extraction yields on the order of from 38% to 42% soluble solids by weight may be obtained readily. Thus, the treated beans provide a substantially higher extraction yield upon brewing in comparison with like beans which have been roasted with hot circulating gases. The treated beans also provide a higher yield than do beans which have been hydrolyzed and then roasted with hot circulating gases because the roasting step decreases much of the increased yield obtained from the hydrolysis reaction. Likewise, it will be noted that if the treated beans of the present invention are subjected to such a roasting step, the brew extraction yield is reduced.

Additionally, the process of the present invention modifies the beans to provide beans which produce brews which have aromatic and flavor characteristics distinctly different from those obtained from like beans which have been roasted with heated gases or which have been steam roasted in a manner not in accordance with the present invention, which is believed due, particularly, to the employment of the inert gas atmosphere during processing. Even though the extracts obtained from the treated beans provide extracts having significant acidity, this characteristic is utilized advantageously particularly when so-called low-grade coffees are treated, although the process of this invention is not intended to be limited to treatment of only such coffees. In particular, because of the high acidity of extracts obtained from the treated beans, the treated beans are utilized advantageously to prepare blends of coffees in which the treated beans provide, or intensify, sensations of "bite" and "raspiness", in moderation, and of "snap" and "wineyness" which commonly are associated with high quality coffees but which are not found generally in coffees generally regarded as being low-grade and inferior.

Thus, particularly in the case of treating the socalled low-grade beans, the process of the present invention extends the usefulness of such beans and provides treated beans which provide not only a high yield but which also are capable of imparting aromatic and flavor characteristics which are not only compatible with the aromatic and flavor characteristics of high quality coffees but which also enhance desirable characteristics of the high quality coffees. In the case of Robusta beans, for example, the typical Robusta flavor characteristics are reduced substantially, and the treated beans provide extracts which add characteristics and notes which provide a complex range of organoleptic sensations which are advantageous for preparing specialized blends which may be adapted to a wide variety of consumer tastes.

The process of the present invention is characterized by three essential elements. The first element of importance is increasing the moisture content of the green beans to be heat-treated to at least about 25% by weight based upon the total weight of the moisturized beans. The second element of importance is that the beans are moisturized in the presence of a substantially inert gas atmosphere under a positive pressure. The third element of importance is heating the moisturized beans in the substantially inert gas atmosphere to a temperature sufficient and for a time sufficient for generating and carrying out the hydrolysis and pyrolysis reactions while avoiding charring. It is believed that this combination of elements enables the pyrolysis reaction, in particular, to be carried out to an extent, while substantially avoiding charring, which enables elimination of the necessity of a conventional roasting step, i.e., heating with hot gases, and the realization of the resulting high extraction brew yields and aromatic and flavor characteristics.

For purposes of this disclosure and claims, "positive pressure" is intended to mean a pressure in excess of atmospheric pressure, and more particularly, a positive gauge pressure.

For purposes of this disclosure and claims, the term "charring" is intended to mean that a chemical decomposition of the coffee beans, which is familiar to the artisan, has occurred. If charring occurs, the color of the beans approaches a charcoal to black coloration by reason of formation of carbonaceous substances, and a burnt taste and/or odor is imparted to the beans.

For objective evaluation of whether charring is substantially avoided, for purposes of this disclosure, procedures and equipment are utilized as described in Publication 53 of the Coffee Brewing Institute (see also "Food Technology", Vol. 14, No. 11, p. 597 (1960)) for determining the color of samples, designated as "Gn", which will indicate charring. Samples which have a Gn of below about 1.8 are deemed to be charred. Thus, samples produced in accordance with this invention in which charring is substantially avoided have a Gn of about 1.8 and above. Desirably, the products produced in accordance with this invention will have a Gn in the range of from about 2 to about 3.5. An acceptable roast color may have a Gn as high as about 5, however.

Generally, it is preferred to heat-treat moisturized beans having a moisture content of at least about 30% by weight, more preferably from about 30% to about 45% by weight, and most preferably from about 35% to about 45% by weight, because the hydrolysis and pyrolysis reactions are controlled more easily at the higher moisture contents. That is, in general, the lower the moisture content of the beans, the more gentle the applied reaction conditions usually should be, particularly for reasons of not only quality but for safety, because of the potential for the reaction to become exothermic which may result in yielding not only charring but also increased temperatures resulting in pressure build-up in the heat-treatment vessel.

In accordance with the present invention, the beans are purged of the atmosphere surrounding them by introducing an inert gas about the beans in a vessel containing them so that, at the time of moisturizing the beans, a substantially inert gas atmosphere is contained about the beans. That is, the atmosphere of the vessel is such that gases other than inert gases, especially oxygen, substantially are excluded. After purging, the vessel is closed off from the atmosphere, and the inert atmosphere in the vessel then is pressurized to a positive pressure by introducing the inert gas for carrying out the moisturizing step. Although any positive pressure of an inert gas may be utilized and will provide for generation of the characteristics unique to the beans treated in accordance with this invention, present findings appear to indicate that significant alteration of aromatic and flavor characteristics of coffees treated in accordance with the procedures of this invention begin to appear when the pressure is initially charged to a positive gauge pressure, measured at ambient temperature, of about 1.4 kg/cm$^2$ and above.

After moisturizing the beans, the positive pressure of the inert atmosphere may be retained and the beans may be treated in accordance with the invention of Saeed Ahmad Husaini disclosed in a commonly assigned U.S. application Ser. No. 07/265,059 entitled Treatment of Green Coffee. However, prior to heating the moisturized beans in the heat-treatment step, it is preferred that the positive pressure of the inert gas atmosphere be released to create a blanket of inert gas at substantially atmospheric pressure about the moisturized beans which allows the hydrolysis and pyrolysis reactions to proceed at lower operating pressures.

Characteristics of the final product also are related to the temperature and time of heating the moisturized beans for generating the hydrolysis and pyrolysis reactions. That is, the extent of hydrolysis and pyrolysis, which produces the increased extraction yield and promotes the aromatics and flavor characteristics and the coloration of the treated beans, is related to the temperature and time of heating in the heat-treatment step.

For achieving hydrolysis and pyrolysis while substantially avoiding charring in accordance with this invention, when utilizing the moisture contents indicated above, although heat-treating temperatures on the order of from about 130° C. to about 195° C. and even above 195° C. may be applied to the moisturized beans, temperatures on the order of from about 150° C. to about 190° C. are preferred, and temperatures on the order of from about 180° C. to about 190° C. are more preferred. The length of time of heating required is generally in an inverse relationship to the temperature applied and generally is on the order of from about 5 mins. to about 30 mins. That is, generally, the higher the bean temperature for treatment, the shorter the time of heating and vice versa.

After heat-treating the moisturized beans, drying of the hydrolyzed and pyrolyzed beans may be accomplished with conventional drying means, such with as dryers which have means to pass hot air over and/or through a bed of the treated hydrolyzed and pyrolyzed beans.

These and other features and advantages will become further apparent from the following Detailed Description of the Invention and Examples.

DETAILED DESCRIPTION OF THE INVENTION

Increasing the moisture content of the green coffee beans in a substantially inert atmosphere under a positive pressure to at least about 25% by weight may be accomplished conveniently in any suitable enclosed pressure vessel preferably by soaking the beans in water or other aqueous medium, and preferably by soaking with agitation and application of heat which will assist in obtaining uniformity of moisturization and shorten the time required for moisture absorption by the beans. The agitation should be gentle such that the beans are not fragmented or broken. Advantageously, the beans are heated to from about 60° C. to about 125° C. during the moisturizing step and preferably from about 85° C. to about 120° C.

Steam conveniently may be contacted with the soaking beans primarily for heating the beans. Although steam could be utilized solely for moisturizing the beans, it is deemed impractical because a longer time is required to increase the moisture content than is accomplished by soaking and heating, including heating with application of steam, and particularly when a moisture content in excess of about 30% to about 35% is sought, steam does not condense efficiently or sufficiently to attain such moisture contents practically.

Equipment for moisturizing and heat-treating the beans can be of simple design and may comprise various types of vessels, with the caveat that the vessels are capable of maintaining and withstanding the positive pressures charged into and the pressures created in the vessels. The vessels preferably are capable of providing movement of the beans to maintain them in a dynamic condition to assist in obtaining uniformity of treatment conditions. Particularly in a batch-type system, although mechanical stirring may be utilized, a tumbling action appears best suited to ensure uniformity of moisturization and is preferred. In a continuous operation, a vessel having a conventional driving screw means has been found to be advantageous for providing agitating dynamic movement. When tumbling, the vessel may be tumbled at from about 1 RPM to about 10 RPM. When utilizing a vessel having a screw, the vessel design and the rate of rotation of the screw are a function of the retention time desired for the beans to move through the vessel for treatment.

Jacketed vessels which provide the opportunity for heating the inner surface of the walls of the vessels, such as with steam or other heat source means, are preferred. To determine the bean temperature, a probe may be affixed within the vessel for contact with the beans. Supply of inert gas for creating the substantially inert atmosphere under positive pressure may be achieved by well known means.

In addition to utilizing merely water for moisturizing green beans, aqueous extracts of green or roasted coffee and aqueous condensates, such as may be collected from evaporating aqueous coffee extracts, and combinations of aqueous extracts and aqueous condensates are utilized advantageously for moisturizing the beans, as in the Husaini invention, as such liquids contain volatiles and acids which can contribute to improved olfactory and organoleptic properties of the final treated product. In the case where extracts are utilized, the extracts preferably have a low soluble solids content. Aqueous extracts or condensates having solids contents of up to about 10% to about 15% by weight are utilized advantageously. Extracts having solids contents of from about 20% to about 25% by weight or higher can be utilized, but it is more difficult for these higher solids amounts to be incorporated with the beans and solids losses may be incurred because of decreased incorporation efficiency.

The amount of water required for moisturizing the beans may be determined readily by equating it by weight with regard to the weight of green coffee beans to be treated since it is accepted, generally, that green beans can contain substantially equal amounts of water and dry matter by weight. Of course, as the artisan will appreciate, the amount of water taken up will be affected by the initial moisture content of the green beans and not all green beans will conform with the general rule. Thus, it is possible that some beans may absorb water and be substantially saturated when water comprises only 45% or so by weight based on the total weight of the moisturized beans, for example, while other beans may absorb and contain moisture such that water comprises up to some 60% by weight based upon the total weight of the moisturized beans. Moreover, even the same variety of beans may vary from batch to batch in regard of the amount of water the beans can absorb and contain. Thus, for uniformity of results, the artisan will desire to test the beans to be treated for determining their moisture absorbing and containing capacity.

When operating in accordance with the embodiments of this invention, if steam is utilized in conjunction with water in the moisturizing step and if steam is utilized as a means for heating in the heat-treatment step, the amount of moisture added to the treated beans is a function of process temperature and steam quality i.e., whether the steam is superheated or saturated, for example. In such procedures, it has been found that, usually, the steam will impart from about 10% to 20% of the total moisture content by weight of the heat-treated hydrolyzed and pyrolyzed beans.

In practice, in a batch-type system, with the green beans placed preferably together with a predetermined amount of moisturizing medium, which may be water, preferably deionized water, or condensate, or extract, or combinations thereof, in the moisturizing vessel, the atmosphere about the beans in the vessel first is purged by introducing an inert gas in the vessel about the beans. After purging, the vessel is closed off from the atmosphere and insert gas is introduced into the vessel for establishing the inert gas atmosphere under a positive pressure. Preferably, the vessel is charged to gauge pressures of from about 1.4 kg/cm$^2$ to about 7 kg/cm$^2$ and more preferably, to pressures of from 1.4 kg/cm$^2$ to about 5 kg/cm$^2$, and most preferably to about 3.5 kg/cm$^2$. Although pressures above 7 kg/cm$^2$ may be utilized, present findings do not appear to indicate that there would be significant quality improvement or other advantage in utilizing such pressures.

Any inert gas, which includes carbon dioxide, nitrogen, helium, argon, etc., and combinations thereof, may be utilized. Carbon dioxide is preferred.

Although not required, preferably, the beans are placed in a dynamic gently agitated condition, such as by tumbling, and preferably, heat is applied to the beans contained in the pressurized inert gas atmosphere to raise the temperature of the beans to from about 60° C. to about 125° C. to lessen the time required for the beans to absorb the moisture.

After completion of the moisturization of the beans in a batch-type system, it is preferred to vent the vessel containing the moisturized beans to reduce the pressure of the inert gas to substantially atmospheric pressure. The vessel then is closed off to the atmosphere leaving a blanket of inert gas and a substantially inert gas atmosphere in the vessel about the beans. Preferably, the beans are continued to be maintained in a dynamic condition during this step of the process.

After closing off the vessel to the atmosphere, although various means may be employed to heat the beans, including, but not limited to, heating by means of only a jacket of a jacketed vessel, steam conveniently is provided to contact the beans, preferably together with heat provided by a jacket of a jacketed vessel, for raising the temperature of the beans to the desired heat-treatment temperatures, preferably on the order of from about 150° C. to about 195° C. and most preferably from about 180° C. to about 190° C., for generating the hydrolysis and pyrolysis reactions. As in the moisturization step, the temperature of the beans may be determined by means such as a probe which contacts the beans in the vessel, and although not required, affirmative agitation of the beans is preferred for avoiding localized heating of the beans. As noted, although stirring may be utilized, a tumbling action is most advantageous in a batch-type system.

Upon completion of the heat-treatment step, preferably, the pressure extant in the vessel is reduced gradually to avoid bursting or breaking of the hydrolyzed and pyrolyzed beans. Other than preferably gently releasing the pressure from the heating vessel prior to obtaining the beans for drying, no special precautions need be taken with the heat-treated beans, although it is advisable not to allow the beans to remain in the atmosphere for extended periods of time.

In an advantageous embodiment for carrying out the process of the present invention in a continuous manner, in the moisturizing step, green beans are fed into a system having a surge means, such as a tube, prior to a pressure lock. Green beans are fed to the surge, and air is purged from the beans in the surge by introducing an inert gas to blanket the beans to create a substantially inert atmosphere about the beans. Quantities of the beans then are fed intermittently from the surge into the pressure lock which contains a substantially inert gas atmosphere. With the beans secured in the lock, the lock then is pressurized with the inert gas to a pressure as indicated above. The beans then are fed from the lock, preferably by gravity, to a vessel which preferably is jacketed, which contains a screw and in which a substantially inert atmosphere exists under substantially the same pressure as that in the lock. The moisturizing medium is injected into the screw vessel preferably near the bean entrance to contact the beans for moisturizing them. The moisturized beans are heated in the screw vessel to a temperature indicated above by heat provided by the jacket and/or internally injected steam, or by other appropriate means, while the beans are moved through the vessel by the screw.

In this continuous embodiment, the moisturized beans are fed from the moisturizing screw vessel via a surge means to a second pressure lock which contains a substantially inert gas atmosphere under substantially the same pressure as in the screw vessel. When the moisturized beans are in the lock, the lock then is isolated. The pressurized inert gas about the moisturized beans is vented from the lock to obtain an inert gas blanket pressure about the moisturized beans which is at substantially atmospheric pressure, and then the lock is closed off to the atmosphere to maintain the inert blanket about the moisturized beans which are thus maintained in a substantially inert gas atmosphere.

As steam is conveniently utilized as a heating means in the heat-treatment step, steam is introduced into the lock to pressurize it to a pressure which is substantially the same as the pressure to be utilized in the heat-treating step. The steam-pressurized beans then are fed, preferably by gravity, via a surge means to another vessel which is preferably jacketed and which contains a screw for agitating and moving the beans through the vessel. The jacket is heated and steam is injected into the vessel, preferably near the entrance of the beans into the vessel, to produce a bean temperature in the vessel sufficient for hydrolyzing and pyrolyzing the beans, as discussed above as the beans are moved through the vessel by the screw. After the moisturized beans have been retained in the screw vessel for a time sufficient and at the temperature sufficient for hydrolyzing and pyrolyzing them without charring, they then are fed from the heat-treating screw vessel via a surge to a pressure lock which is at a pressure substantially the same as the pressure in the screw vessel. As with the batch system discussed above, preferably, prior to the discharge from the continuous system for drying, the pressure extant in the last pressure lock is released gradually before discharging the treated beans.

In either a batch-type or continuous system, and particularly when heat and agitation are utilized, the time required for moisturizing the green beans to a moisture content of from at least about 25% to about 45% to 50% or so by weight, generally, is on the order of from about 7 mins. to about 12 mins. Additionally, in general, in either a batch-type or continuous system, when beans have been moisturized at temperatures on the order of from about 60° C. to about 125° C., it will take the beans from about 4 mins. to about 7 mins. to reach the heat-treating temperature.

After reaching the heat-treatment temperature, heat-treatment times on the order of from about 5 mins. up to about 30 mins. and preferably from about 7 mins. to about 15 mins. are utilized. At temperatures on the order of about 175° C. to about 190° C., heat-treatment times on the order of from about 9 mins. to about 12 mins. preferably are utilized. In general, if temperatures above about 195° C. are utilized, because of increased potential of charring, times on the order of about 5 minutes or less generally are advisedly utilized. Although less efficient, temperatures from about 130° C. to about 150° C. also may be utilized, however, in general, heating times longer than 30 mins are required for achieving the desired reactions at these lower temperatures.

After release of the pressure, whether it be from the heat-treating vessel of a batch system or from a lock of a continuous system, the hydrolyzed and pyrolyzed beans are collected and dried to a stable moisture content which may be on the order of from up to about 3% to about 5% by weight. Various conventional means may be utilized for drying. As indicated above, a forced air dryer may be utilized conveniently to dry the heat-treated beans at temperatures of from about 65° C. to about 150° C., for example. The main criterion of drying is that the dried heat-treated hydrolyzed and pyrolyzed beans be dried to a stable moisture content such that staling during storage prior to consumption is avoided In preferred embodiments of this invention, the beans are not fully saturated with moisture after the heat-treatment step, and although some condensation will occur on the beans particularly during the heat-treatment step and may have a tendency to extract or leach some soluble solids from the beans, the treated beans do tend to absorb the condensed moisture and adsorb the leached or extracted solids.

If, however, the beans are fully saturated and there is liquid present after the hydrolysis and pyrolysis step, the liquid should be returned to the beans to avoid undue solids loss and impairment of the yield increase feature of the present invention. Thus, when liquid, that is, water and soluble solids, exists after heat-treating the beans, as in the Husaini invention, the liquid and the treated beans are separated by conventional means such as by straining with a screen, for example. After separation of the treated beans from the liquid, the hydrolyzed and pyrolyzed beans then are dried, and the liquid then is incorporated into the dried treated beans by contacting the liquid and dried treated beans for absorbing the water and for adsorbing the solids. If there is a large excess of liquid and if it has a soluble solids content of up to about 15% to about 20%, by weight, it advantageously is concentrated to a solids content of from about 35% to about 45% solids by weight, and the concentrate then is contacted with the dried treated beans for absorption of water and adsorption of the soluble solids.

The incorporation of the liquid into the dried treated beans is accomplished preferably in an enclosed vessel to prevent volatiles losses, with gentle agitation for avoiding damage to the beans and at a temperature, preferably, of from about 60° C. to about 70° C. The treated beans containing the absorbed liquid and adsorbed soluble solids then are dried by procedures such as disclosed above.

The beans treated in accordance with the disclosure of the embodiments above may be ground and extracted without further treatment of the product. Generally, the treated beans will not be utilized alone for the preparation of a beverage, but will be blended with other coffees which have been processed such as by roasting with heated gases. Although not required and not preferred, the treated beans may be further treated by roasting such as with hot gases, which may provide a more intense or defined full roast note, but as noted, the yield will be lowered.

EXAMPLES

The following Examples are illustrative of the invention. Parts and percentages are by weight unless otherwise indicated. In determining "extraction yield", the amount of solids in the brew on a dry weight basis is utilized for calculating the extraction yield based upon the weight on a dry weight basis of the coffee extracted.

EXAMPLE I

About 11.4 kg of a blend of varieties of Robusta green beans is placed in a jacketed tumbler vessel with about 6.8 kg deionized water. The vessel is purged of its atmosphere by introducing carbon dioxide and then the vessel is closed to the atmosphere. The vessel is tumbled at a rate of about 5 RPM and brought to a gauge pressure of about 3.5 kg/cm$^2$ by introducing carbon dioxide. The beans are maintained in the tumbling vessel for about 10 mins while steam is supplied to the jacket and steam is injected into the vessel to contact the beans which are brought to a temperature of about 82° C. as indicated by a probe in the vessel which is contacted by the tumbling beans. While tumbling is continued, the vessel then is vented for release of the inert gas positive pressure to about atmospheric pressure and then the vent is closed. Steam under a pressure of about 9.5 kg/cm$^2$ then is supplied to the jacket and injected into the vessel to contact the beans for providing a bean temperature of about 180° C. Readings from the probe indicate that the beans reach a temperature of from about 177° C. to about 182° C. in about 4 mins. The heat-treatment including tumbling is continued for about 12 more mins.

After the heat-treatment, the pressure is released gently from the vessel. There is no excess liquid present in the vessel. The beans are dark brown and are dried in a FITZPATRICK forced air dryer at about 107° C. for about 1 hour. The dried beans have a moisture content of about 4.6% by weight.

The dried treated beans are ground and have a Gn of about 3.6. The ground beans are extracted in an automatic drip coffee maker. The extraction yield is about 41.7%.

EXAMPLE II

The same varieties of green coffee beans as in Example I are utilized. The amount of beans and water and the treatment conditions are the same in this Example as in Example I, except that the pressure of the carbon dioxide inert atmosphere is charged to a gauge pressure of about 7 kg/cm$^2$ for moisturizing the beans. The pressure is vented. Upon heat-treating, a temperature of about 177° C. was reached in about 7 mins. and treatment was continued for about 12 more mins. The treated beans are ground and have a Gn of about 3.8. The ground beans are extracted as in Example I and provide an extraction yield of about 40.5%

COMPARISON EXAMPLE I

The same varieties of green coffee beans are utilized in this experiment as in Examples I and II. The equipment and the amount of beans and water are the same as in those Examples. The vessel is pressurized to about 3.5 kg/cm$^2$ with air for the moisturization step. While tumbling is performed, steam is applied to the jacket of the vessel and injected into the vessel to contact the beans for about 10 mins. which brings the temperature of the beans to about 82° C. After about 10 mins. the pressure is not released and steam is injected into the vessel to provide a temperature of about 177° C. After reaching that temperature, the beans are maintained at that temperature for about 10 mins. The pressure is gently released, and upon inspection, there is no excess liquid present and the beans are now dark brown.

These treated beans are ground and extracted as in Examples I and II. The extraction yield is about 37%.

A blend of a commercial roast and ground coffee and the ground coffee of Example II is prepared. A blend of the commercial coffee and the ground coffee of this Example is prepared. Each blend contains about 78% by weight of the commercial coffee and about 22% by weight of the samples, each based on the total weight of each blend.

Two triangle taste tests are performed with the blends. The blend prepared with the treated coffee beans of Example II is the odd cup.

In a first taste test, 6 of 6 tasters pick the odd cup, a significance of 99.86%. An average of preferences indicates preference for the odd cup, and an average of hedonic ratings favors the blend prepared with the treated beans of Example II.

In a second test, 7 of 10 tasters pick the odd cup, a significance of 98.03%.

COMPARISON EXAMPLE II

One sample of about 11.6 kg of a blend of Robusta beans is moisturized with about 4.5 kg water in a jacketed vessel which is purged with carbon dioxide, pressurized to about 3.5 kg/cm$^2$, and tumbled while steam is injected into the jacket and into the vessel to contact the beans for about 10 mins., and a bean temperature of about 82° C. is obtained. The vessel is vented to atmospheric pressure, closed to the atmosphere and then steam is injected at a pressure of about 10 kg/cm$^2$ into the jacket and into the vessel to contact the beans to obtain a bean temperature of about 177° C. which is achieved in about 2 mins. The temperature rises to slightly above 179° C. and after about 6 mins. falls back slightly before the steaming is stopped at about 12 mins. at a temperature of about 177° C. Then the vessel is vented slowly, and the beans are removed.

About 16 kg of treated beans are obtained which are dark brown in color. The beans are dried and designated as Sample A.

A second 11.6 kg sample of the same blend of Robusta beans is treated in the same manner as the first sample except after about 10 mins. of moisturizing the beans, the pressure is not vented. Then steam under a pressure of about 10.2 kg/cm$^2$ is injected into the jacket and into the vessel for about 3 mins. which brings the beans to a temperature of about 154° C. The pressure of the steam is increased to about 12.7 kg/cm$^2$ and supplied for about 13 mins. The beans are at a temperature of about 173° C. at about 7 mins. and at about 13 mins. the bean temperature is about 177° C.

About 15.2 kg of beans which are dark brown are obtained. The beans are dried and designated Sample B.

A third sample of about 11.6 kg of the same Robusta blend is moisturized with about 4.5 kg of water, but the vessel is pressurized to about 3.5 kg/cm$^2$ with air. Steam is injected for about 10 mins. into the jacket and into the vessel, as above, and a temperature of about 82° C. is obtained. The vessel is vented of the pressure, closed off and then steam under a pressure of about 10.2 kg/cm$^2$ is introduced into the jacket and into the vessel to contact the beans to obtain a temperature of about 177° C. which is achieved in about 4 mins. The temperature and the steam injection continues with tumbling for about 12 more mins. which provides a bean temperature of about 179° C. The vessel is vented and cooled.

About 21.4 kg of treated beans are obtained which are dark brown in color. The beans are dried and designated as Sample C.

Each sample is ground and extracted as in the prior Examples, and Samples A, B and C provide, respectively, extraction brew yields of about 37.6%, 39.8% and 35.8%.

Ground Samples A and C are extracted and each is taste tested, with Sample C being the odd cup. Of 11 tasters, 8 pick the odd cup which provides a significance of 99.12%.

Ground Samples A and B are also extracted and each is tasted, with Sample B being the odd cup. 9 of 9 tasters pick the odd cup, a significance of 99.99%. Preference ratings are relatively similar and the hedonic rating for Sample A is higher than that for Sample B.

10g each of ground Samples A and C are blended with 35g of a commercial roast and ground coffee for providing samples for a panel of 9 tasters. The sample prepared with Sample C coffee is the odd cup.

8 of 9 tasters pick the odd cup, a significance of 99.90%. Preference is relatively evenly divided and hedonic ratings are relatively similar with Sample A having a higher rating.

EXAMPLE III

Robusta coffee beans are treated in a continuous system by feeding the green beans from a hopper to a surge tube which precedes a pressure lock. The atmosphere about the beans in the surge tube is purged by introducing carbon dioxide. The lock likewise contains carbon dioxide and is opened intermittently to accept the beans having a blanket of inert gas about them. Upon closing the lock, carbon dioxide is injected into the lock to obtain a positive pressure of about 3.7 kg/cm$^2$. After being pressurized, the beans are dropped from the lock into a surge tube connected to an entry of a jacketed vessel and containing a screw having a carbon dioxide atmosphere pressurized to about 3.7 kg/cm$^2$. A temperature of about 88° C. is applied to the beans via the jacket. The screw moves the beans through the vessel such that beans are retained in the vessel for about 10 mins. Water is continually injected at a position near the entry point of the beans into the screw vessel in an amount sufficient to obtain a moisture content of the beans of about 35% by weight based upon the weight of the moisturized beans exiting the screw.

Beans exiting the moisturizing vessel collect in a surge tube, and the collected beans are intermittently introduced into a lock which has been pressurized with steam to about 3.7 kg/cm$^2$. With the beans in the pressurized lock, the pressure is vented to about atmospheric pressure and then closed. A blanket of carbon dioxide which is at about atmospheric pressure remains about the beans. The lock then is pressurized with steam to a pressure of about 11.6 kg/cm$^2$. Upon attaining that pressure, the beans are dropped to a surge tube connected to an entry of another jacketed vessel containing a screw, the surge tube and screw vessel being under a pressure of about 11.6 kg/cm$^2$. The screw moves the beans through the vessel such that the beans are retained in the vessel for about 20 mins. The jacket of the vessel is heated to about 187° C., and steam is injected into the vessel at a position near the entry for the beans into the screw vessel and maintains the pressure of about 11.6 kg/cm$^2$. Beans exiting the screw into a surge tube have a temperature of about 184° C. The treated beans then are introduced intermittently from the surge tube into a lock maintained under a pressure of about 11.6 kg/cm$^2$. After the lock is isolated, the pressure is vented slowly from the lock to about atmospheric pressure, and then the beans are discharged from the lock.

The treated beans are dried in a FITZPATRICK fluid bed dryer at a temperature of about 108° C. to a moisture content of about 2.3% by weight.

The beans are ground and have a Gn of about 2.3 and provide an extraction yield of about 33%.

From the foregoing, it will be apparent to one of ordinary skill that various equipment, conditions and parameters may be utilized for practicing the present invention without departing from the spirit and scope of the invention as defined by the following claims.

We claim:

1. A product of a process for treating coffee beans comprising:
    increasing the moisture content of green coffee beans contained in the presence of a substantially inert gas atmosphere under a positive pressure for obtaining moisturized beans having a moisture content of at least about 25% by weight based upon the total weight of the moisturized beans;
    heating the moisturized beans contained in a substantially inert gas atmosphere to a temperature sufficient and for a time sufficient for hydrolyzing and pyrolyzing the moisturized beans while avoiding charring them; and then
    drying the hydrolyzed and pyrolyzed beans to a stable moisture content.

2. A product of a process according to claim 1 wherein the inert atmosphere in which the green beans are moisturized is initially charged to a positive pressure of at least about 1.4 kg/cm$^2$.

3. A product of a process according to claim 1 wherein the inert atmosphere in which the moisturized beans are heated for hydrolyzing and pyrolyzing them is initially at about substantially atmospheric pressure.

4. A product of a process according to claim 1 wherein carbon dioxide comprises the substantially inert atmosphere while moisturizing the green beans and while heating the moisturized beans.

5. A process according to claim 1 wherein steam is contacted with the moisturized beans for heating them for hydrolyzing and pyrolyzing them while avoiding charring.

6. A product of a process according to claim 1 wherein the moisture content of the green beans is increased by soaking the green beans in a liquid selected from a group consisting of water, an aqueous extract of coffee, an aqueous condensate obtained from coffee extract and combinations of extract and condensate.

7. A product of a process according to claim 1 wherein the green beans are moisturized to a moisture content of from about 30% to about 45% by weight based upon the weight of the moisturized beans.

8. A product of a process according to claim 1 further comprising agitating the moisturized beans while heating them for hydrolyzing and pyrolyzing them while avoiding charring.

9. A product of a process according to claim 1 wherein the beans are moisturized at a temperature of from about 60° C. to about 125° C. and wherein the moisturized beans are heated to a temperature of from about 150° C. to about 195° C. for from about 5 mins. to about 30 mins. for hydrolyzing and pyrolyzing them while avoiding charring.

10. A product of a process for treating coffee beans comprising:
   introducing an inert gas about green coffee beans in a vessel for providing a substantially inert gas atmosphere about the green beans;
   increasing the pressure of the inert gas atmosphere about the green beans to a positive pressure of at least 1.4 kg/cm$^2$;
   increasing the moisture content of the green beans in the pressurized inert atmosphere for obtaining moisturized beans having a moisture content of at least about 25% by weight based upon the total weight of the moisturized beans;
   releasing the pressure of the pressurized inert atmosphere about the moisturized beans to a pressure which is at substantially atmospheric pressure while maintaining the beans in a substantially inert atmosphere;
   heating the moisturized beans in the substantially inert atmosphere, while agitating the moisturized beans being heated, to a temperature sufficient and for a time sufficient for hydrolyzing and pyrolyzing the moisturized beans while avoiding charring them; and then
   drying the hydrolyzed and pyrolyzed beans to a stable moisture content.

11. A product of the process according to claim 10 wherein the green beans are moisturized at a temperature of from about 60° C. to about 125° C. to a moisture content of from about 30% to 45% by weight based upon the weight of the moisturized beans and wherein the moisturized beans are heated to a temperature of from about 150° C. to about 190° C. for from about 5 mins to about 30 mins for hydrolyzing and pyrolyzing them while avoiding charring and further comprising agitating the green beans while moisturizing them.

12. A product of the process according to claim 10 wherein carbon dioxide comprises the substantially inert atmosphere while moisturizing the green beans and while heating the moisturized beans.

13. A product of the process according to claim 11 wherein carbon dioxide comprises the substantially inert atmosphere while moisturizing the green beans and while heating the moisturized beans.

14. A product of a process for treating coffee beans comprising:
   feeding green coffee beans into a first surge means vessel;
   introducing an inert gas into the surge means vessel for purging air from the surge means vessel providing a substantially inert gas atmosphere about the green beans;
   feeding the green beans from the surge means vessel to a first pressure lock vessel which contains a substantially inert atmosphere, securing the beans in the first pressure lock vessel and then increasing the pressure of the inert gas atmosphere about the beans to a positive pressure of at least 1.4 g/cm$^2$;
   feeding the beans under the pressurized atmosphere from the first pressure lock vessel to a first screw vessel having a substantially inert atmosphere under a pressure which is substantially the same as that in the first pressure lock vessel and, while moving the beans through the first screw vessel, introducing moisturizing medium into the first screw vessel for increasing the moisture content of the beans for obtaining moisturized beans having a moisture content of at least about 25% by weight based upon the total weight of the moisturized beans;
   feeding the moisturized beans from the first screw vessel to a second pressure lock vessel which contains a substantially inert atmosphere under a pressure which is substantially the same as that in the first screw vessel, isolating the moisturized beans in the second pressure lock vessel and then releasing the pressure of the substantially inert atmosphere about the moisturized beans to a pressure which is at substantially atmospheric pressure and maintaining the beans in a substantially inert atmosphere;
   feeding the beans to a second screw vessel having a substantially inert atmosphere and, while moving them through the second screw vessel, heating and moisturized means to a temperature sufficient and for a time sufficient for hydrolyzing and pyrolyzing the moisturized beans while avoiding charring them;
   feeding the hydrolyzed and pyrolyzed beans to a third pressure lock vessel and releasing pressure from the lock;
   discharging the hydrolyzed and pyrolyzed beans from the third pressure lock vessel; and then
   drying the hydrolyzed and pyrolyzed beans to a stable moisture content.

* * * * *

UNITED STATES PATENT AND TRADEMARK OFFICE
CERTIFICATE OF CORRECTION

PATENT NO. : 5,114,731

DATED : May 19, 1992

INVENTOR(S) : David L. BELVILLE, et al.

It is certified that error appears in the above-identified patent and that said Letters Patent is hereby corrected as shown below:

On the title page, under the caption "Inventors" (item [75]), "Donald E. Wetherilt" should be --Donald L. Wetherilt--.

under the heading "References Cited U.S. PATENT DOCUMENTS" (item [56]), line 8, "4/1985" should be --9/1985--.

Column 14, in each of lines 55, 59 and 63 (line 1 of each of claims 2-4), delete the lower case "a" and insert therefor --the--.

Column 14, line 67 (line 1 of claim 5), after "A", insert --product of the--.

UNITED STATES PATENT AND TRADEMARK OFFICE
CERTIFICATE OF CORRECTION

PATENT NO. : 5,114,731
DATED : May 19, 1992
INVENTOR(S) : David L. BELVILLE, et al.

Page 2 of 2

It is certified that error appears in the above-identified patent and that said Letters Patent is hereby corrected as shown below:

Column 15, in each of lines 3, 9, 13 and 17 (line 1 of each of claims 6-9), delete the lower case "a" and insert therefor --the--.

Column 16, line 48 (line 39 of claim 14), delete "means" and insert therefor --beans--.

Signed and Sealed this

Twentieth Day of July, 1993

Attest:

MICHAEL K. KIRK

*Attesting Officer*  *Acting Commissioner of Patents and Trademarks*